United States Patent
Tsou et al.

(10) Patent No.: US 7,044,392 B2
(45) Date of Patent: May 16, 2006

(54) CARD DEVICE WITH A SWEEP-TYPE FINGERPRINT SENSOR

(75) Inventors: Chingfu Tsou, Hou Li Hsiang (TW); Bruce C. S. Chou, Hsin Chu (TW)

(73) Assignee: LighTuning Tech. Inc., Hsinchu (TW)

( * ) Notice: Subject to any disclaimer, the term of this patent is extended or adjusted under 35 U.S.C. 154(b) by 7 days.

(21) Appl. No.: 10/849,775

(22) Filed: May 21, 2004

(65) Prior Publication Data

US 2004/0238647 A1 Dec. 2, 2004

(30) Foreign Application Priority Data

May 29, 2003 (TW) ................. 92114621 A

(51) Int. Cl.
*G06K 19/06* (2006.01)

(52) U.S. Cl. .................. 235/492; 235/439; 235/380

(58) Field of Classification Search ........... 235/492, 235/380, 382, 439, 454; 340/5.52, 5.53; 382/115, 312, 313

See application file for complete search history.

(56) References Cited

U.S. PATENT DOCUMENTS

| 4,582,985 A | 4/1986 | Lofberg |
| 6,360,953 B1 * | 3/2002 | Lin et al. ............ 235/492 |
| 6,494,380 B1 | 12/2002 | Jarosz |
| 6,653,723 B1 * | 11/2003 | Manansala ............ 257/680 |
| 6,785,407 B1 * | 8/2004 | Tschudi et al. ........ 382/124 |
| 2004/0179718 A1 * | 9/2004 | Chou .................... 382/115 |

FOREIGN PATENT DOCUMENTS

JP        2000-076412      * 3/2000

* cited by examiner

*Primary Examiner*—Karl D. Frech
*Assistant Examiner*—Kristy A. Haupt
(74) *Attorney, Agent, or Firm*—Birch Stewart Kolasch & Birch LLP

(57) ABSTRACT

A card device includes a substrate having two long sides and two short sides, and a sweep-type fingerprint sensor embedded into the substrate. The sweep-type fingerprint sensor has an exposed fingerprint sensing surface, and is disposed in a rectangular low-stress region. The rectangular low-stress region has a dimension substantially smaller than or equal to 30 mm*22 mm. The shortest distance from the low-stress region to each long side is substantially equal to 2 mm, and the shortest distance from the low-stress region to each short side is substantially equal to 2 mm.

16 Claims, 6 Drawing Sheets

CARD DEVICE WITH A SWEEP-TYPE FINGERPRINT SENSOR

This Non-provisional application claims priority under 35 U.S.C. § 119(a) on Patent Application No(s). 092114621 filed in Taiwan on May 29, 2003, the entire contents of which are hereby incorporated by reference.

BACKGROUND OF THE INVENTION

1. Field of the Invention

The invention relates to a card device with a fingerprint sensor, and more particularly to a card device with a sweep-type fingerprint sensor.

2. Description of the Related Art

In order to prevent the syndicate from counterfeiting the smart cards such as credit cards, personal identification cards, driver's licenses, passports, social welfare cards and health insurance cards, every card issuer has to spend a lot of resource to protect the smart cards with strict security designs. Because the fingerprint is the personal biometric data and cannot be easily counterfeited, the smart card embedded with the fingerprint sensor becomes one of the mainstream development in the future.

All the fingerprint sensors embedded in the conventional card devices belong to the two-dimensional (2D) sensor. That is, the fingerprint sensor can acquire the finger's fingerprint image as long as the finger statically contacts the fingerprint sensor. For instance, the card devices disclosed in U.S. Pat. Nos. 4,582,985 and 6,494,380 utilize the 2D fingerprint sensors. Owing to the dimensional limitation of the finger, the sensing area of the conventional 2D fingerprint sensor is at least greater than 9 mm*9 mm. Furthermore, owing to the limitation in the dimension of silicon wafer, only 50 to 70 effective chips may be produced in a 6" wafer. The selling price of the single fingerprint sensor is at least greater than 10 U.S.D. with the packaging and testing costs included therein, which will limit the usage of the card device embedded with the fingerprint sensor.

Because the smart card is a portable device, the user may unintentionally apply external forces to the smart card to make it bent or twisted. In this condition, the fingerprint sensor embedded in the smart card may be caused an extreme stress and thus damaged or even fractured. In order to solve the above-mentioned problem, U.S. Pat. No. 6,494,380 discloses a 2D fingerprint sensor that is also composed of a plurality of sensing blocks. Although the problem of the sensor damage in the twisted or curved card device such as the smart card may be solved, the fingerprint image distortion will be caused owing to the spacing between two adjacent sensing blocks. When the most important minutia pattern of the fingerprint is located in the spacing, the fingerprint identifying operation cannot be really completed.

Thus, it is an important subject to provide a low-cost card device (e.g., a smart card) embedded with a fingerprint sensor that cannot be easily damaged.

SUMMARY OF THE INVENTION

It is therefore an object of the invention to provide a low-cost card device having a sweep-type fingerprint sensor that cannot be easily damaged.

The invention achieves the above-mentioned object by providing a card device including a substrate having two long sides and two short sides, and a sweep-type fingerprint sensor embedded into the substrate. The sweep-type fingerprint sensor has an exposed fingerprint sensing surface, and is disposed in a rectangular low-stress region. The rectangular low-stress region has a dimension substantially smaller than or equal to 30 mm*22 mm. The shortest distance from the low-stress region to each long side is substantially equal to 2 mm, and the shortest distance from the low-stress region to the short side is substantially equal to 2 mm.

The substrate is preferably formed with a groove, in which the sweep-type fingerprint sensor is positioned, wherein the groove is for guiding the user to put his/her finger therein, and guiding the finger to sweep across the sweep-type fingerprint sensor.

DETAILED DESCRIPTION OF THE INVENTION

A card device having a sweep-type fingerprint sensor has been disclosed in the commonly-assigned U.S. patent application Ser. No. 10/793,929, filed on Mar. 8, 2004, published as U.S. 2004/0179718, and entitled "CARD-TYPE BIOMETRIC IDENTIFICATION DEVICE AND METHOD THEREFOR." A sweep-type fingerprint sensor adapted to a card device has been disclosed also in the commonly-assigned U.S. patent application Ser. No. 10/441,022, filed on May 20, 2003, published as U.S.2004/0234110, and entitled "SWEEP-TYPE FINGERPRINT SENSOR MODULE AND A SENSING METHOD THEREFOR."

Figure 1:
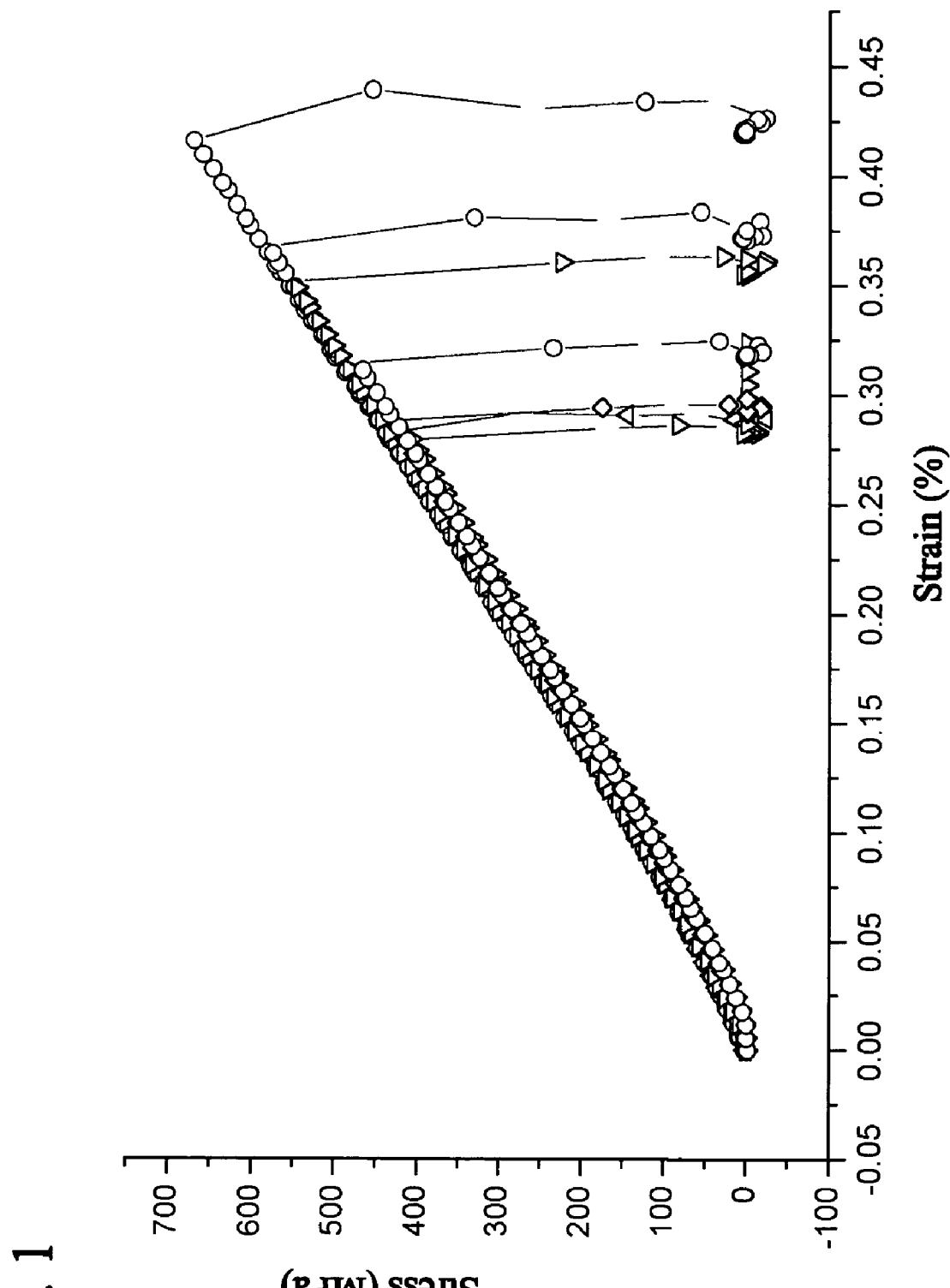
FIG. 1 shows the stress-strain relation of a silicon substrate of a sweep-type fingerprint sensor of the invention.
Figure 2:
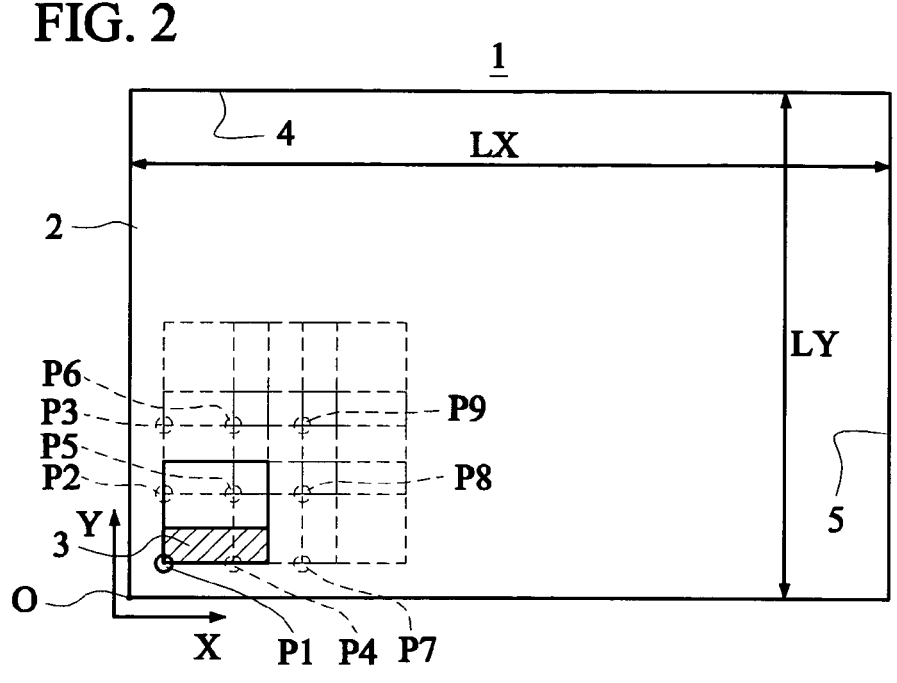
FIG. 2 is a top view showing a card device with a sweep-type fingerprint sensor of the invention.

FIG. 1 shows the stress-strain relation of a silicon substrate of a sweep-type fingerprint sensor of the invention, which are tested by way of three-point bending. The invention takes 7 silicon substrate specimens for test with the testing condition of pressing down the middle point of the silicon substrate at the speed of 0.001 mm/sec, and the test results are shown in FIG. 1. It can be understood from FIG. 1 that the fracture strength of the silicon substrate is about 350 MPa.

In order to realize the stress of the sweep-type fingerprint sensor caused when the card device is bent or twisted, the invention adopts the finite element method for analysis and simulation. The simulated card device has the dimension of about 86*56*0.78 mm, which is the general card dimension all over the world, and the fingerprint sensor is a 2D fingerprint sensor having the dimension of 12*12*0.53 mm. The derived maximum stress cannot exceed the allowable fracture strength of the fingerprint sensor. It is to be noted that because the derived stress in the simulation process is the maximum stress, the low-stress region suitable for the 2D fingerprint sensor also may be regarded as being suitable for the sweep-type fingerprint sensor.

FIGS. 2 to 5 are respectively top, front, side and pictorial views showing a card device with a sweep-type fingerprint sensor of the invention. Referring to FIGS. 2 to 5, the card device 1 of the invention includes a substrate 2, which has two long sides 4 and two short sides 5, and a sweep-type fingerprint sensor 3, which is embedded into the substrate 2 and has an exposed fingerprint sensing surface 6. As disclosed in the above-mentioned U.S. Publication No. 2004/0234110, the fingerprint sensor 3 acquires a plurality of fingerprint fragment images of a finger as the finger sweeps across the fingerprint sensor, and two adjacent ones of the plurality of fingerprint fragment images partially overlap with each other. In terms of the general standard specification of the current card device 1, the length LX of the long side 4 is 86 mm and the length LY of the short side 5 is 56 mm.

In order to prevent the sweep-type fingerprint sensor 3, which is embedded into the substrate 2, from being damaged when the card device 1 is bent or twisted, the invention calculates the maximum stress according to the physical properties of the substrate 2 and the sweep-type fingerprint sensor 3, wherein the calculated maximum stress cannot exceed the fracture strength of the sweep-type fingerprint sensor 3. The sweep-type fingerprint sensor 3 of the invention is usually made of silicon. The fracture strength of the sweep-type fingerprint sensor 3 of the invention is about 350 MPa according to the experimental test result. Thus, the configurations are suitable for the invention as long as the corresponding maximum stresses applied to the sweep-type fingerprint sensor 3 are smaller than 350 MPa after the card device 1 is bent or twisted. For the sake of stress concentration effect consideration, the stress safety factor is chosen to be 1.15. Thus, the maximum stress of the disposed sensor cannot exceed 304 MPa.

Theoretically, when the card device 1 is bent or twisted, the exerted stresses are the minimum at its four corners. So, the card device 1 should be close to one of the corners as possible as it can. The invention disposes a 2D fingerprint sensor with the dimension of 12*12*0.53 mm on the card device 1, and makes the analysis according to various disposing positions so as to derive the maximum stress exerted on the 2D fingerprint sensor. The above-mentioned maximum stress may correspond to the maximum stress exerted on the sweep-type fingerprint sensor 3 of the invention under the same condition. Herein, nine disposing positions are proposed, as shown in the corner points of the positions P1 to P9 of the 2D fingerprint sensor. If the coordinate of the original O is (0,0), the coordinates of the corner points of the positions P1 to P9 are respectively P1=(4,4), P2=(4,12), P3=(4,20), P4=(12,4), P5=(12,12), P6=(12,20), P7=(20,4), P8=(20,12), and P9=(20,20).

Figure 4:
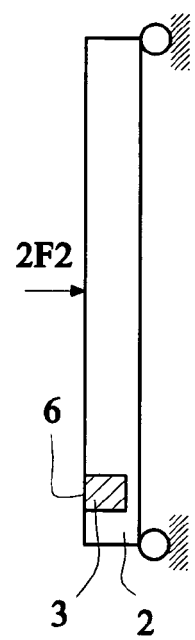
FIG. 4 is a side view showing the card device with the sweep-type fingerprint sensor of the invention.
Figure 3:
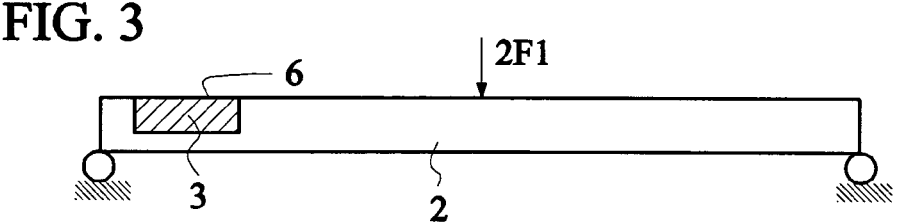
FIG. 3 is a front view showing the card device with the sweep-type fingerprint sensor of the invention.
Figure 5:
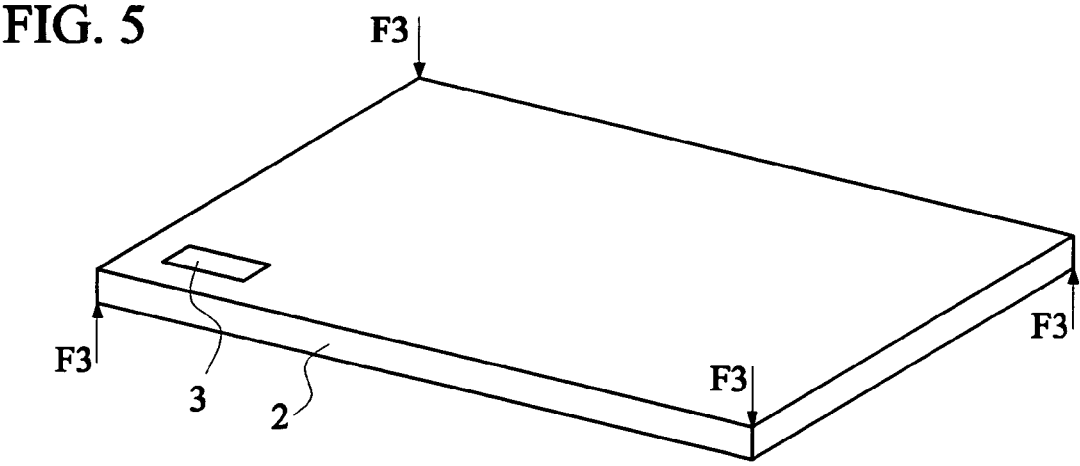
FIG. 5 is a pictorial view showing the card device with the sweep-type fingerprint sensor of the invention.

The force-exerting simulation condition for the card device 1 is made according to the bending and twisting standard testing specification of "ISO 7816 Standards for Cards," wherein the associated analysis processes are described in the following. In FIG. 3, two sides of the card device 1 are simply supported and a downward force 2F1 is applied to the middle of the card device 1 such that the maximum deformation in the middle of the card device 1 is 2 cm downward. In FIG. 4, the two sides of the card device 1 are simply supported and a rightward force 2F2 is applied to the middle of the card device 1 such that the maximum deformation in the middle of the card device 1 is 1 cm rightward. In FIG. 5, forces F3 are respectively applied to the four corner points of the card device 1 such that the card device 1 is twisted ±15 degrees.

Figure 6:
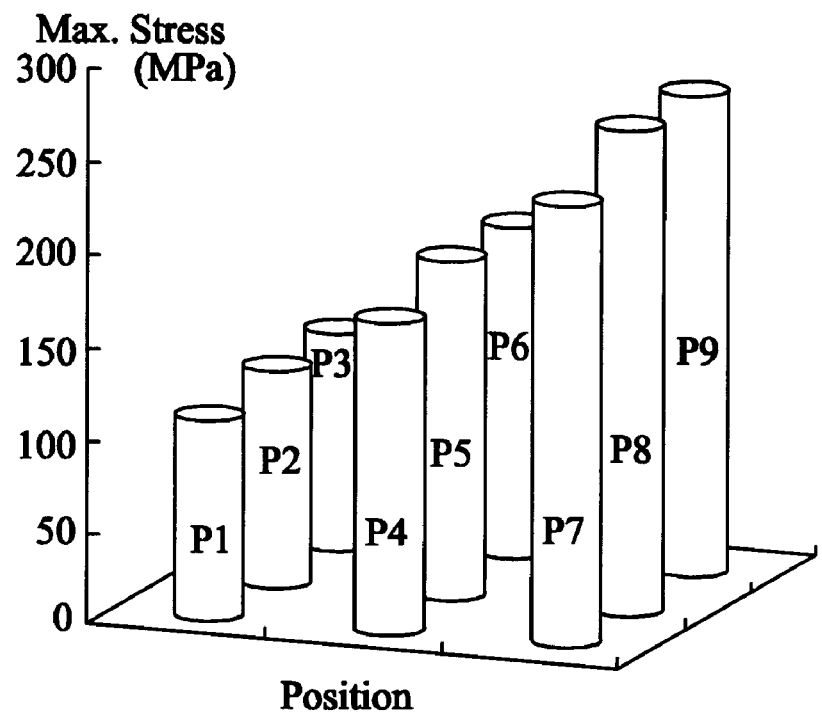
FIG. 6 shows the stress distribution result of a curved state of FIG. 3.

FIG. 6 shows the stress distribution result of a curved state of FIG. 3. As shown in FIG. 6, the maximum stresses exerted on the sweep-type fingerprint sensor 3 at positions P1 to P9 are respectively 108, 114, 113, 167, 181, 180, 238, 259 and 258 MPa. Thus, as the position of the sweep-type fingerprint sensor 3 is closer to the perpendicular bisector of the long side 4, the exerted stress is larger.

Figure 7:
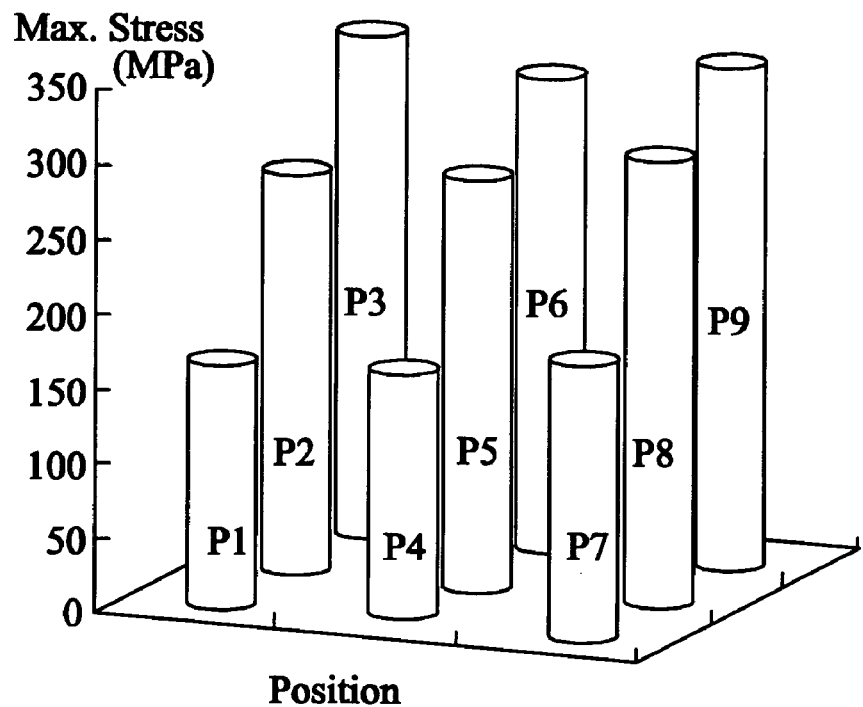
FIG. 7 shows the stress distribution result of a curved state of FIG. 4.

FIG. 7 shows the stress distribution result of a curved state of FIG. 4. As shown in FIG. 7, the maximum stresses exerted on the sweep-type fingerprint sensor 3 at positions P1 to P9 are respectively 163, 263, 330, 170, 270, 314, 183, 295 and 330 MPa. So, as the position of the sweep-type fingerprint sensor 3 is closer to the perpendicular bisector of the short side 5, the exerted stress is larger.

Figure 8:
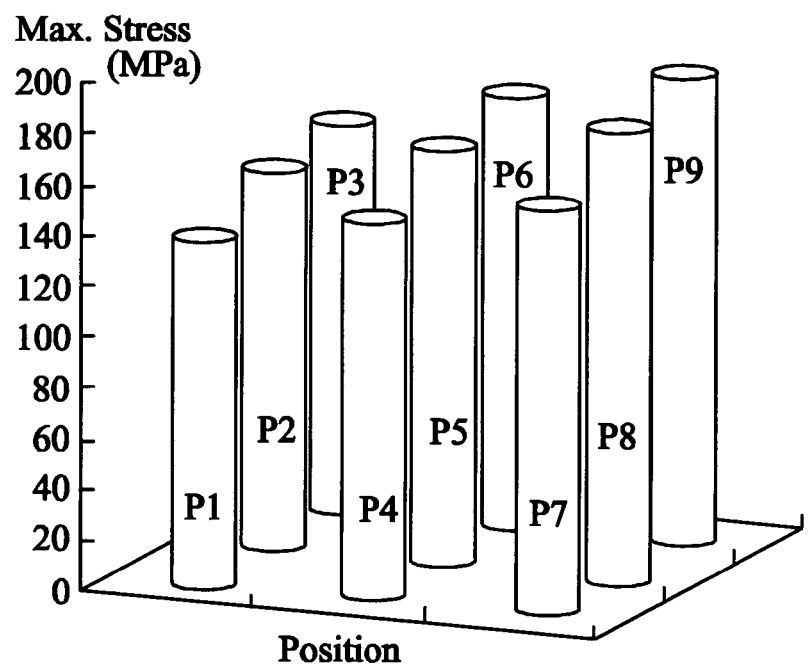
FIG. 8 shows the stress distribution result of a curved state of FIG. 5.

FIG. 8 shows the stress distribution result of a curved state of FIG. 5. As shown in FIG. 8, the maximum stresses exerted on the sweep-type fingerprint sensor 3 at positions P1 to P9 are respectively 135, 148, 152, 148, 163, 169, 160, 176 and 182 MPa. So, as the position of the sweep-type fingerprint sensor 3 is closer to the center of the card device 1, the exerted stress is larger.

It can be understood, from the above-mentioned results, that the maximum stresses exerted on the sweep-type fingerprint sensor 3 at positions P3, P6 and P9 exceed 304 MPa. So, the sweep-type fingerprint sensor 3 only can be located at the position of P1, P2, P4, P5, P7 or P8, or any position among P1, P2, P4, P5, P7 and P8. It also can be understood from the result that as the sweep-type fingerprint sensor 3 is closer to the long side 4 or short side 5, the exerted maximum stress is smaller. Therefore, the sweep-type fingerprint sensor 3 may be theoretical located within the range from the coordinates (0, 0) to (32, 24). However, owing to the limitations of the manufacturing, packaging, testing and using of the card device 1, the ranges that are too close to the long side or short side are not suitable for the arrangement of the sweep-type fingerprint sensor 3. According to this rule, the portions within about 2 mm from the long side and short side are not suitable for the arrangement of the sweep-type fingerprint sensor 3. Consequently, the actual sweep-type fingerprint sensor 3 should be located within the range from the coordinates (2, 2) to (32, 24), preferably located within the range from the coordinates (2, 2) to (24, 24), and more preferably located within the range from the coordinates (2, 2) to (24, 16).

Figure 9:
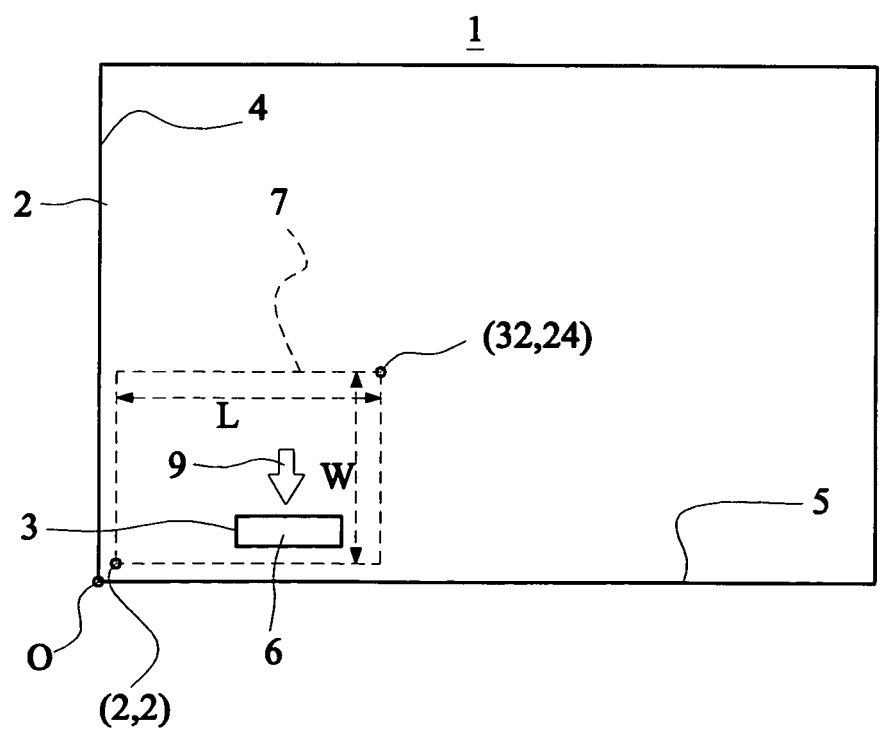
FIG. 9 is a top view showing a card device according to a first embodiment of the invention.

FIG. 9 is a top view showing a card device according to a first embodiment of the invention. As shown in FIG. 9, the sweep-type fingerprint sensor 3 is disposed in a rectangular low-stress region 7. The low-stress region 7 is the region defined by the above-derived coordinates of (2, 2) and (32, 24). Consequently, the dimension of the low-stress region 7 is "safety length L (=30 mm)*safety width W (=22 mm)," and the shortest distance from the low-stress region 7 to the short side 5 and the long side 4 is 2 mm.

In this embodiment, the sweep-type fingerprint sensor 3 is parallel to the long side 4. That is, the fingerprint sensing surface 6 is configured such that a finger sweeps across it in a direction 9, wherein the direction 9 and each long side 4 define an angle substantially equal to 90 degrees.

Figure 10:
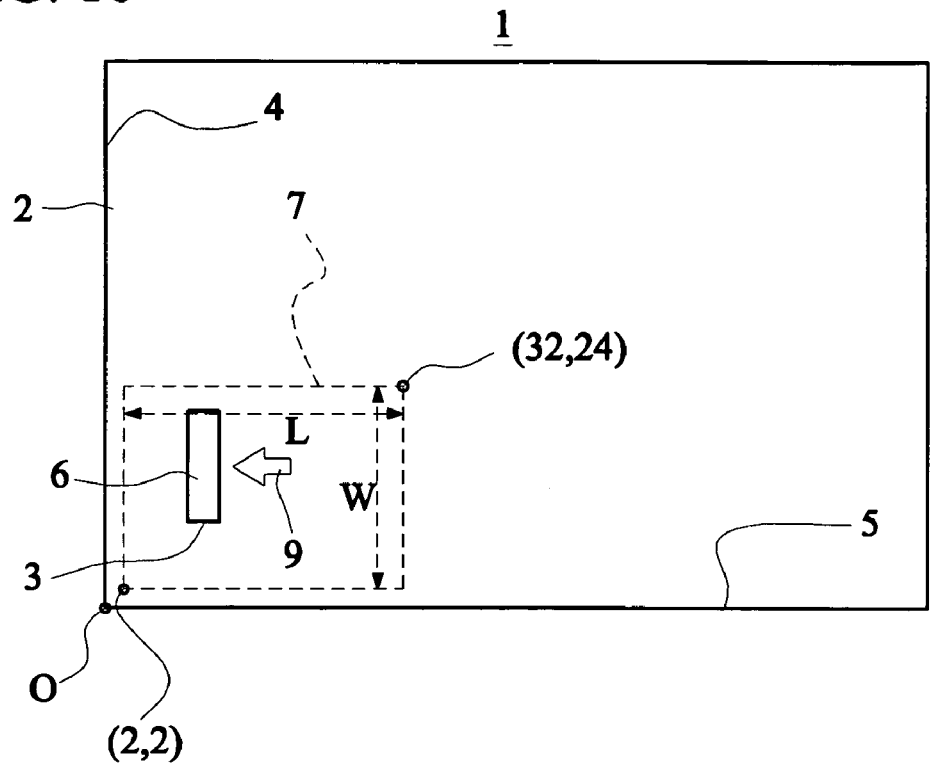
FIG. 10 is a top view showing a card device according to a second embodiment of the invention.

FIG. 10 is a top view showing a card device according to a second embodiment of the invention. As shown in FIG. 10, the sweep-type fingerprint sensor 3 is also disposed in the low-stress region 7. What is different from the first embodiment is that the sweep-type fingerprint sensor 3 of the second embodiment is parallel to the short side 5. That is, the fingerprint sensing surface 6 is configured such that the finger sweeps across it in the direction 9, wherein the direction 9 and each long side 4 define an angle substantially equal to 0 degrees.

Figure 11:
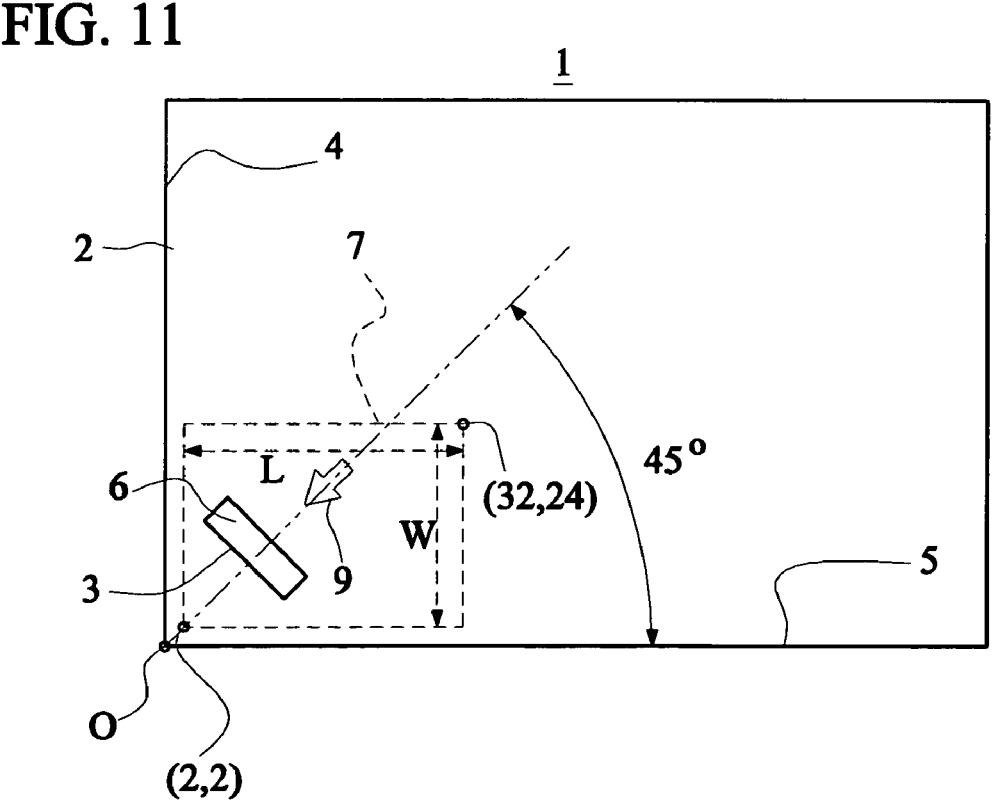
FIG. 11 is a top view showing a card device according to a third embodiment of the invention.

FIG. 11 is a top view showing a card device according to a third embodiment of the invention. As shown in FIG. 11, the sweep-type fingerprint sensor 3 is also disposed in the low-stress region 7. What is different from the first embodiment is that the fingerprint sensing surface 6 of the third embodiment is configured such that the finger sweeps across it in the direction 9, wherein the direction and each long side 4 define an angle substantially equal to 45 degrees.

Figure 12:
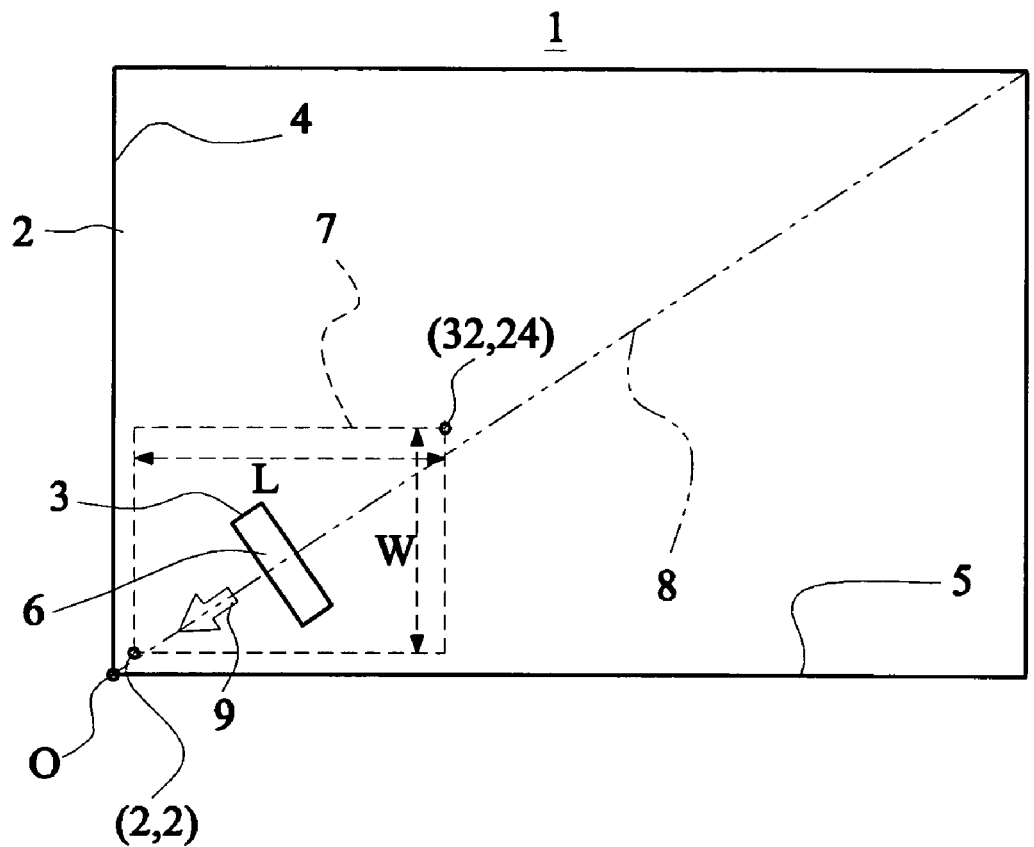
FIG. 12 is a top view showing a card device according to a fourth embodiment of the invention.

FIG. 12 is a top view showing a card device according to a fourth embodiment of the invention. As shown in FIG. 12, the sweep-type fingerprint sensor 3 is also disposed in the low-stress region 7. What is different from the first embodiment is that the fingerprint sensing surface 6 of the fourth embodiment is configured such that the finger sweeps across it in the direction 9, wherein the direction 9 and each long side 4 define an angle, which is substantially equal to that defined by a diagonal 8 of the substrate 2 and each long side 4.

Figure 13:
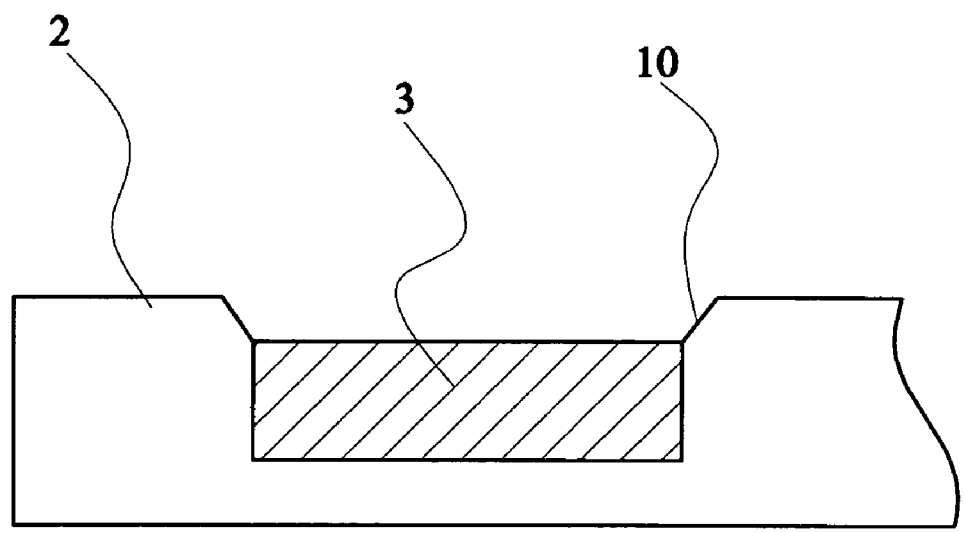
FIG. 13 is a partially cross-sectional view showing a card device according to a fifth embodiment of the invention.

FIG. 13 is a partially cross-sectional view showing a card device according to a fifth embodiment of the invention. In this embodiment, a groove 10 is formed on the substrate 2, and the sweep-type fingerprint sensor 3 is located in the groove 10. The groove 10 is for guiding the finger to put therein and guiding the finger to sweep across the sweep-type fingerprint sensor 3. As a result, the groove may guide the user to use the sweep-type fingerprint sensor 3 for fingerprint reading rapidly.

In order to solve the prior art drawbacks, the invention provides a card device having a sweep-type fingerprint sensor located in the low-stress region as the criterion for actual applications. Thus, the cost may be greatly reduced, the application field of this device may be widened, and the problem of chip damage owing to the stress can be overcome. Furthermore, the invention also provides a guiding groove for the sweep-type fingerprint sensor so as to make the user find the sensing surface of the sweep-type fingerprint sensor rapidly. In addition, the groove may also guide the finger to sweep in a straight line direction as possible as it can, so as to simplify the subsequent image reconstruction operations.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A card device, comprising:
   a substrate having two long sides and two short sides; and
   a fingerprint sensor, which is embedded into the substrate and has an exposed fingerprint sensing surface and acquires a plurality of fingerprint fragment images of a finger as the finger sweeps across the fingerprint sensor, wherein two adjacent ones of the plurality of fingerprint fragment images partially overlap with each other, the fingerprint sensor is disposed in a rectangular low-stress region having a dimension substantially smaller than or equal to 30 mm*22 mm, the shortest distance from the low-stress region to each of the long sides is substantially equal to 2 mm, and the shortest distance from the low-stress region to each of the short sides is substantially equal to 2 mm.

2. The card device according to claim 1, wherein the rectangular low-stress region has the dimension substantially equal to 22 mm*22 mm.

3. The card device according to claim 1, wherein the rectangular low-stress region has the dimension substantially equal to 22 mm*14 mm.

4. The card device according to claim 1, wherein each of the short sides has a length substantially equal to 56 mm.

5. The card device according to claim 4, wherein each of the long sides has a length substantially equal to 86 mm.

6. The card device according to claim 1, wherein the fingerprint sensing surface is configured such that the finger sweeps across the fingerprint sensing surface in a direction, which defines an angle with each of the long sides.

7. The card device according to claim 6, wherein the angle is substantially equal to 90 degrees.

8. The card device according to claim 6, wherein the angle is substantially equal to 0 degrees.

9. The card device according to claim 6, wherein the angle is substantially equal to 45 degrees.

10. The card device according to claim 6, wherein the angle is substantially equal to that defined by a diagonal of the substrate and each of the long sides.

11. The card device according to claim 1, wherein:
    a groove is formed on the substrate;
    the fingerprint sensor is located in the groove;
    the groove is for guiding the finger to put therein and guiding the finger to sweep across the fingerprint sensor.

12. The card device according to claim 11, wherein the fingerprint sensing surface is configured such that the finger sweeps across the fingerprint sensing surface in a direction, which defines an angle with each of the long sides.

13. The card device according to claim 12, wherein the angle is substantially equal to 90 degrees.

14. The card device according to claim 12, wherein the angle is substantially equal to 0 degrees.

15. The card device according to claim 12, wherein the angle is substantially equal to 45 degrees.

16. The card device according to claim 12, wherein the angle is substantially equal to that defined by a diagonal of the substrate and each of the long sides.

* * * * *